Patented June 28, 1949

2,474,571

UNITED STATES PATENT OFFICE 2,474,571

LOW-TEMPERATURE POLYMERIZATION PROCESS

Paul W. Brakeley, Jr., Plainfield, and David W. Young, Roselle, N. J., assignors to Standard Oil Development Company, a corporation of Delaware No Drawing. Application March 28, 1946, Serial No. 657,906

5 Claims. (Cl. 260—85.3)

1

This invention relates to low temperature polymerization processes, relates particularly to means for improving isobutylenic polymers; and relates especially to a process for arresting the low temperature olefinic polymerization at the peak of polymerization activity to produce a polymer having a narrower molecular weight range distribution, a higher plasticity value, and superior properties in admixture with other polymers.

Isobutylene has been polymerized by a wide variety of processes over a wide range of reduced temperatures to yield polymers having Staudinger molecular weight numbers ranging from a few hundred to 500,000 or more. It is found, however, that no matter what average molecular weight is obtained, the molecules in any given sample of polymer show a range of molecular weight which may be from double the average molecular weight to a minimum of a few hundred or a few thousand. It is possible to produce polymers of narrow molecular weight range by a precipitation procedure in which the polymer is, after recovery, dissolved in solvents such as light naptha and fractionally precipitated by the addition of successive small quantities of a non-solvent such as one of the alcohols, ethers, organic acids and the like. This process is however unsatisfactory because of the difficulty of removing all of the solvent, and the fact that a satisfactory separation can be obtained only from very dilute solutions; necessarily less than 10% and usually less than 5%, with the result that the amount of solvent required is unduly great. It has also been suggested that the polymerization reaction could be arrested when a very impure olefin mixture containing other olefins than isobutylene was polymerized, before the mixture was allowed to warm up, to prevent polymerization of the normal olefins in the impure mixture into interfering substances.

The present invention makes use of the fact that when a very pure sample of isobutylene having a purity of 98 to 99.5% is polymerized and the reaction halted when it is at the peak of the polymerization reactivity there is obtained a polymer of unusually narrow molecular weight range, in which the range is less than 10% or 20% of the average molecular weight and the material is substantially free from low ends or low polymers.

Thus the invention polymerizes isobutylene at a low temperature within the range between about —40° C. to —103° C. in the substantial absence of impurities, by the application to the cold pure olefin (in the presence of a non-reactive diluent refrigerant if desired) or an olefinic mixture of a Friedel-Crafts catalyst such as boron trifluoride or dissolved aluminum chloride; and, at the peak of the polymerization reaction activity, arresting the catalyst activity to yield a high molecular weight polyisobutylene of extremely narrow molecular weight range. Other objects and details of the invention will be apparent from the following description.

In practicing the invention, a supply of isobutylene is obtained having a purity preferably within the range between 96% and 99.5%, or higher if possible. Isobutylene of this degree of purity is conveniently obtained by absorption in cold sulfuric acid, dilution with water, and heating; as is well known in the art. The pure isobutylene is then cooled to a temperature within the range between 0° C. and —103° C. depending upon the molecular weight desired in the finished product since the lower the temperature the higher the molecular weight. The isobutylene may be cooled in any desired way as by the use of refrigerating jackets upon storage containers and reactor, the jacket containing such refrigerants as liquid propane, liquid sulfur dioxide, liquid carbon dioxide, liquid ammonia, liquid ethane, liquid ethylene or the like.

Alternatively, the cooling may be obtained by the direct admixture of a suitable diluent refrigerant with the liquid isobutylene; such substances as liquid propane, solid carbon dioxide, liquid ethane and liquid ethylene being particularly suitable; the several substances yielding temperatures of about —40, about —78, about —88 and about —103, although in each instance the mixed boiling point is from one to several degrees higher than the figures given, depending upon the proportions of refrigerant and isobutylene.

The reaction may, if desired, be conducted upon the substantially pure isobutylene in the absence of another substance; or upon a mixture of the isobutylene with another polymerizable olefin which is preferably a multiolefin such as butadiene or the like. Preferably, however, the olefinic material is diluted with an inert diluent such as ethyl or methyl chloride, or propane (when it is not used as a refrigerant), or butane, or pentane, or light naphtha or other inert low-boiling hydrocarbons, or carbon disulfide or a fluorinated hydrocarbon or a chloro-fluorinated hydrocarbon or the like. Of these materials, the preferred diluents are the alkyl halides which include all of the aliphatic compounds containing one or more halogen substituents which have freezing points below about 0° C. without regard to the number of carbon atoms per molecule or the number of halogen substituents. It may be noted that the presence of the inert diluent considerably improves the character of the polymer, and, alone, yields some reduction in the molecular weight range of the resultant polymer; which reduction in range is more than additive when the catalyst-destroying process of the present invention is used.

The isobutylene or olefinic mixture is then polymerized by a Friedel-Crafts catalyst. The preferred catalysts are boron trifluoride or aluminum chloride. For some purposes the boron trifluoride may be used in gaseous form. For others, it is preferably dissolved in a convenient solvent such as butane, or propane, or ethane, or other hydrocarbon, or in a halogenated hydrocarbon depending to some extent upon the temperature of polymerization and the presence or absence of a diluent or a diluent-refrigerant admixed with the isobutylene. Alternatively, aluminum chloride in solution in low freezing non-complex forming solvent is particularly satisfactory because of its high catalytic power.

The two catalysts above listed are the ones preferred. However, any of the Friedel-Crafts catalyst substances disclosed by N. O. Calloway in his article on "The Friedel-Crafts synthesis" printed in the issue of "Chemical Reviews" published for the American Chemical Society at Baltimore in 1935, in volume XVII, No. 3, the article beginning on page 327, the list being particularly well shown on page 375, may be used. Most of these catalysts are preferably used in solution, although boron trifluoride may be used directly in gaseous form by bubbling the gas through the cold isobutylene; and titanium tetrachloride which is liquid at most of the polymerization temperatures may be conveniently be used directly; but even these two catalysts produce superior results when dissolved in an appropriate solvent.

For the catalyst solvent, such substances as the mono or poly halogenated aliphatic substances having freezing points below 0° C., thereby being low freezing, are conveniently used. All of these substances are non-reactive with the Friedel-Crafts catalyst substances; that is, they may be boiled away from the solute with a purely nominal rise of temperature of one or two degrees to leave a solvent free solute, thereby indicating the non-formation of complex substances between the solvent and Friedel-Crafts metal halide.

The catalyst may be applied to the cold olefinic material in any desired way but it is usually preferable that the catalyst be incorporated into the cold olefin as quickly as possible, particularly for the purposes of the present invention. The preferred method is by the discharge of a small stream of catalyst solution under high pressure into the body of rapidly stirred cold isobutylene; pressures of from 25 to 200 lbs. on the catalyst solution being advantageous.

The reaction proceeds very promptly, the induction period usually being less than $\frac{1}{10}$ second and frequently unmeasurably short. The reaction proceeds at good speed building up to a peak rate and intensity, after which if no interference occurs, the rate decreases and may finally slow down to a very low polymerizing rate for residual small quantities of isobutylene.

According to the present invention, the catalyst is discharged rapidly into the body of cold olefinic material and the reaction is allowed to proceed for a matter of a small number of seconds, usually from one to three or four, and then a relatively large quantity of catalyst destroying agent is added to the reaction mixture.

It is found that approximately 0.8% of a Friedel-Crafts catalyst is sufficient to polymerize substantially all of the isobutylene; in some instances as little as 0.5% being enough and in other instances as much as 3% being required, depending to some extent on the presence of traces of unknown impurities and to some extent upon the particular catalyst used.

In any event, the total amount of catalyst is preferably delivered to the cold isobutylene within a time interval of 5 to 15 seconds and the catalyst destroying agent is added within one or two seconds after the last of the catalyst has been added. The catalyst agent accordingly is usually added under circumstances in which there is sufficient catalyst present to polymerize all or nearly all of the isobutylene present, but only from 40% to 70% of the isobutylene is actually polymerized and the reaction is brought to a very sudden halt by the rapid stirring in of the catalyst destroying agent into the polymerizate mixture at the peak of the polymerization activity.

For the catalyst destroying agent, the lower alcohols such as ethyl, methyl, propyl, butyl alcohol and the like are highly satisfactory. Of these, the preferred is usually isopropyl alcohol since it is highly effective and easily separated from unpolymerized isobutylene at a later stage in the treating process. Alternatively, almost any of the lower ethers are similarly useful but because of their higher cost they are less desirable commercially. Similarly, the aldehydes are equally useful although in this instance also the higher unit cost makes them not the preferred substance. Likewise, the organic acids are equally effective although in this instance also they are less desirable both because of the higher cost and because a good many of them are solids at the polymerization temperature and by virtue thereof are less reactive. Any of these compounds having from one to about ten carbon atoms are useful. Alternatively, various of the inorganic alkalis such as ammonia or caustic soda, or caustic potash are also useful. However, these substances are not as promptly and effectively operative as are the organic oxygenated compounds. Along with ammonia as such, most of the substituted ammonias, including ethyl amine, methyl amine, propyl amine and the like are also usable, but the higher cost of these substances makes them less advantageous commercially.

When the reaction has been halted by the addition of the catalyst destroying agent, the solid polymer may be recovered in any desired way. A convenient procedure is to dump the reactor contents into warm water. The warm water boils off the unpolymerized isobutylene and any residual refrigerant, catalyst-solvent, and the like and produces a slurry of solid polymer in water, from which it is conveniently recovered by filtering or straining; after which it may be dried either in a tunnel drier or in an oven or on the mill, or by other appropriate means.

As above outlined, the resulting dry polymer may have an average molecular weight of any desired value, preferably however from 30,000 to 500,000 or above and the molecular weight range of the polymer is usually less than 10 or 20% of the average weight. That is, a polymer having an average weight of approximately 100,000 may contain no substantial amount of molecules having molecular weights above 105,000 to 110,000 and no substantial amount of low ends having molecular weights below 95,000 or 90,000. This material is then found to have a very much higher viscosity for a given average molecular weight than is obtainable from even the most carefully made polymers of prior processes.

The resulting narrow range polymer is highly advantageous for many commercial uses.

The polymer is highly resistant to mechanical breakdown when in solution with lubricating oil, and it is therefore a superior thickener for lubricants, yielding a satisfactory thickening amount, a satisfactory viscosity index and a very much greater lubricant life. The relatively high viscosity of the narrow-range molecular weight polymer, and at the same time its solubility in rubber, makes it a preferred material for plasticizing and improving natural rubber for use in inner tubes. The low proportion of low-molecular weight material greatly reduces the tackiness of the polymer, and, accordingly, the material is highly advantageous when compounded with a proper amount of rubber and white pigments for manufacture of white side-wall tire shoes since the low tackiness of the cured compound avoids the adhesion of dust, dirt, and the like, and the absence of low ends greatly improves its stability. Similarly, these low molecular weight range polymers are highly advantageous for paper coatings, either alone or in combination with paraffin wax, since the absence of low-weight polymers greatly improves the "blocking" characteristics of the coated paper, making it possible to avoid adhesion between successive sheets even though coated with paraffin and polymer. Similarly, the materials are superior for use in cable coverings, weather-resistant paints, tank linings and the like, where a good degree of flexibility with low tackiness and a minimum of "cold flow" are desirable. Similarly, these polymers are superior for use in chewing gum, since there are no oily ends to bloom out or exude, and for tank linings where the low cold-flow and low tackiness make a superior and more desirable lining. Similarly, these low-range polymers are superior for compounding with polyethylene in which they yield an excellent plasticizing effect without imparting tackiness or an undue cold flow to the mixture, yet yielding excellent processing properties on the hot mill, in the Banbury mill, and the like. That is, these polymers are superior for nearly every use to which polyisobutylene or isobutylenic polymers can be put.

A particularly important use for the narrow range high molecular weight polymer is in admixture with the copolymer of isobutylene and a diolefin such as isoprene which is known as "butyl." Difficulty has been encountered in automobile services in making inner tubes out of this polymer as a substitute for rubber inner tubes for military purposes because of the low bruise resistance of the pure polymer to the necessary handling and processing involved in the making of inner tubes. Polyisobutylene has been found to be helpful in improving the bruise resistance but the present polymer is very much superior since the same gain in bruise resistance can be obtained with considerably less of the polymer, thereby improving the tensile strength of the finished and cured inner tube, or a much higher bruise resistance can be obtained with the same amount of polyisobutylene.

EXAMPLE 1

A series of polymerizations were conducted as shown in the subjoined Table I. Isobutylene of 98% purity was cooled by the admixture thereinto of approximately two volumes of liquid ethane to one volume of isobutylene to produce a temperature of approximately −85° C.; and the material was polymerized by the addition of approximately 1% by weight of gaseous boron trifluoride, the catalyst being added at a rate of 3 liters/minute to the strongly stirred cold isobutylene. The first six polymerizations shown in subjoined Table I were not halted but the reaction was allowed to go to completion and the resulting polymer was then recovered from the reaction mixture and the molecular weight and Williams plasticity determined. It will be noted that the average molecular weight varied between 74,000 and 92,500 with the Williams plasticity varying between 185 and 230, with no correlation between molecular weight and plasticity.

Thereafter, six polymerizations were conducted and approximately 5 volumes of isopropyl alcohol per 100 of isobutylene were added to the reactor within one or two seconds of the completion of the addition of the catalyst solution as shown in Table I. It will be noted that the average molecular weight obtained varied from 96,500 to 101,260, and the Williams plasticity varied between 270 and 293. It will be noted that the average molecular weight was increased by some 5% to 10 or 12% but the Williams plasticity was increased from 20% to 30%, showing a substantial difference in the character of polymer obtained. Precipitation studies showed that in the first six polymerizations, a first cut of 5% had an average molecular weight well above 100,000 and successive 5% cuts had progressively decreasing average molecular weight values with a considerable quantity of material having a molecular weight as low as 5,000 to 10,000. The second six polymerizations were similarly subjected to analysis by fractional precipitation and it was found that relatively little material had a molecular weight above about 105,000 and the amount of material having a molecular weight below about 75,000 was less than 5%.

Thereafter, a third series of polymerizations were conducted in which the time delay between the peak of the catalyst reaction and the addition of the catalyst destroying agent was varied to longer and longer time intervals. It will be noted that when a time interval longer than about 10 seconds occurred relatively little improvement in the polymer was obtained; showing that approximately 5 seconds was for most purposes the limiting time within which the catalyst destroying agent could be added.

TABLE I

| Sample number | Alcohol Added After (seconds) | Molecular Weight | Plasticity |
|---|---|---|---|
| 1 | No alcohol | 91,500 | 230 |
| 2 | do | 74,280 | 210 |
| 3 | do | 71,190 | 207 |
| 4 | do | 41,490 | 184 |
| 5 | do | 92,500 | 220 |
| 6 | do | 84,300 | 203 |
| 1 | 1 to 2 | 101,260 | 282 |
| 2 | 1 to 2 | 96,500 | 271 |
| 3 | 1 to 2 | 97,790 | 270 |
| 4 | 1 to 2 | 99,830 | 293 |
| 5 | 1 to 2 | 101,260 | 287 |
| 6 | 1 to 2 | 100,390 | 276 |
| 1 | 1 to 2 | 100,390 | 284 |
| 2 | 1 to 2 | 99,230 | 276 |
| 3 | 5 | 97,990 | 277 |
| 4 | 10 | 85,500 | 261 |
| 5 | 15 | 83,400 | 257 |
| 6 | 15 | 80,300 | 255 |

These results show the effectiveness of this procedure of halting the reaction at its point of maximum activity.

EXAMPLE 2

A series of pairs of polymerization reactions were conducted in which one reaction of each pair was treated within two seconds of the peak of the reaction with the catalyst destroying agent and the other was left with the catalyst undestroyed, with the polymer being separately recovered and the Williams plasticity determined on the various samples taken from these successive polymer periods. The results are shown in the subjoined Table II.

TABLE II

*Typical polymers prepared by quenching technique vs. typical polymers prepared with no quenching*

| Polymer | Original Slug Height | Williams Plasticity | Time Under 5 Kilos Stress | Slug Height After 18 Hours |
|---|---|---|---|---|
|  | *Inches* |  | *Minutes* | *Inches* |
| Quenched | 0.480 | 320 | 3 | 0.485 |
| Unquenched | .475 | 270 | 3 | .448 |
| Quenched | .482 | 293 | 6 | .480 |
| Unquenched | .485 | 255 | 6 | .455 |
| Quenched | .475 | 280 | 9 | .465 |
| Unquenched | .495 | 258 | 9 | .450 |
| Quenched | .480 | 267 | 12 | .440 |
| Unquenched | .500 | 235 | 12 | .425 |
| Quenched | .495 | 263 | 15 | .445 |
| Unquenched | .485 | 233 | 15 | .407 |
| Quenched | .475 | 232 | 30 | .383 |
| Unquenched | .485 | 209 | 30 | .365 |
| Quenched | .475 | 212 | 60 | .300 |
| Unquenched | .485 | 192 | 60 | .280 |

In this series of determinations, the Williams plasticity values were determined by the following procedure: 2 gram samples were taken from each batch of polymer and placed in a metal "slug" mold, duplicate samples being used. The mold was then covered with a flat metal plate and placed in a hydraulic press where it was subjected to a pressure of 7½ tons per sq. in. and simultaneously heated to 275° F. for 10 minutes. This procedure formed the "slugs" into excellent right cylinders which were removed from the mold and allowed to cool. The height of these cylindrical slugs was approximately 0.5". These slugs, after cooling, were placed in an oven at approximately 70° C. for 7 minutes, their heights measured, and then subjected singly to the application of a 5 kg. load in a device known as a "Williams Plastometer," the pressure being continued for three minutes. This weight caused the slugs to flatten out somewhat, and the difference in reading before and after the application of the weight is a measure of the plasticity. After the removal of the load, the slugs were allowed to stand for 18 hours and were then measured again, the increase in height being the "recovery."

In this Table II above, the Williams plasticities of the several polymers prepared by the catalyst destroying technique of the present invention are compared with several polymers prepared by the prior procedures. In each instance, the plasticity of the polymer prepared by destroying the catalyst at the peak of the reaction was superior to that of the destroyed catalyst reaction as is shown by the lower Williams plasticity values; that is, the polymers were definitely tougher, stiffer, and more resistant when prepared by the process of the present invention than by the process of the prior art.

Also, the recovery, that is the height to which the slug will return if the pressure has been removed, is an inverse measure of the rate of cold flow, or that portion of the distortion of the slug which is not reversible. All of the samples tested were subjected to standard time under the weight and were then allowed to cool. The recovery was then measured and in all instances, the polymers prepared by the new procedure showed a higher degree of recovery and thus a less amount of cold flow than did the polymers prepared without the catalyst destroying action. These results show the superior properties of the polymer prepared according to the present process.

In order to determine whether or not the higher plasticities exhibited by the laboratory polymers are due to a narrower molecular distribution, blends of polymers of known M. W. were made and the plasticities determined. This was done both on plant and laboratory polymers. From data summarized in Table III it is evident that the plasticity of a blended polymer is not an additive function of the plasticities of the two components. It is a logarithmic function whereby for a given amount of contaminant (low or high ends) the plasticity of the blend shows a larger proportionate change for the low ends than for the high ends. It is evident that the plasticities of plant polymers show a greater proportionate change for the low ends than do the laboratory polymers for the same concentration of low ends. This indicates that plant polymers are generally of wider molecular distribution than laboratory polymers and that this is the reason for the large difference in plasticity level of plant and laboratory polymers.

Table III indicates the blending effect of varying percentages of a 106,000 polymer in a 41,180 M. W. polymer.

The relation between plasticity and composition of polymer blends can be expressed mathematically by the following equations:

(A) *Effect of heavy ends*

$$\frac{\text{Plasticity of heavy ends log plasticity of blend}}{\text{conc. of heavy ends}} = K \quad (1)$$

(B) *Effect of low ends*

$$\frac{\text{Plasticity of blend log plasticity of low ends}}{\text{conc. of low ends}} = K' \quad (2)$$

The values of $K$ and $K'$ are independent of M. W. as can be seen from the following data:

TABLE III

| Polymer A | Polymer B | Theoretical M. W. | Plasticity | K (from equation 1) |
|---|---|---|---|---|
| *Percent* |  |  |  |  |
| 100 | 0.0 | 41,000 | 110 | -------- |
| 85 | 15.0 | 50,700 | 125 | 0.367 |
| 66.7 | 33.3 | 62,600 | 149 | 0.398 |
| 50.0 | 50.0 | 71,800 | 174 | 0.397 |
| 33.3 | 66.7 | 84,500 | 200 | 0.390 |
| 20.0 | 80.0 | 94,000 | 240 | 0.422 |
| 0.0 | 100.0 | 106,330 | 280 | -------- |

TABLE IV

*Effect of molecular distribution on plasticity*

[Molecular weight]

| Polymer A | Polymer B | Theoretical | Actual | Plasticity | Recovery |
|---|---|---|---|---|---|
| A. PLANT POLYMERS | | | | | |
| Per cent | Per cent | | | | |
| 100 | 0.0 | 41,000 | 41,000 | 110 | 10 |
| 85 | 15.0 | 50,700 | 51,200 | 125 | 23 |
| 66.7 | 33.3 | 62,600 | 56,000 | 149 | 40 |
| 50.0 | 50.0 | 71,800 | 72,000 | 174 | 95 |
| 33.3 | 66.7 | 84,500 | 81,700 | 200 | 107 |
| 20.0 | 80.0 | 94,000 | 91,200 | 240 | 123 |
| 0.0 | 100.0 | 106,330 | 106,330 | 280 | 138 |
| B. LABORATORY POLYMERS | | | | | |
| 100 | 0.0 | 48,200 | 48,200 | 161 | 75 |
| 90 | 10.0 | 54,000 | 54,000 | 159 | 33 |
| 75 | 25.0 | 62,500 | 63,800 | 185 | 83 |
| 50 | 50.0 | 75,750 | 74,500 | 202 | 100 |
| 25 | 75.0 | 90,960 | 88,130 | 238 | 120 |
| 0 | 100.0 | 105,300 | 105,300 | 281 | 111 |

In place of the concentration of the two components in the blend, it is possible to express the effect of the low and high ends in terms of M. W., if in Equations 1 and 2 the concentration factors are replaced by the difference in M. W.

EXAMPLE 3

A good grade of isobutylene having a purity of approximately 98% was mixed, in the ratio of 98 parts by weight with 380 parts by weight of pure liquid ethylene, in a heat-insulated reactor. To this mixture there was added 2 parts by weight of liquid 2-4 dimethyl-butadiene, 1-3, and to this mixture there was then added 0.5 part by weight of ethyl ether which was well stirred in. Simultaneously, a solution of 1.5 parts by weight of boron trifluoride was dissolved in 20 parts by weight of liquid ethylene. This material was then added to the cold olefinic material and stirred in as rapidly as possible. The total time for the addition of the catalyst solution was approximately 20 seconds. In about 18 seconds, that is 38 seconds after the start of catalyst addition, the peak of the reaction was reached, at which time approximately 30 parts by weight of isopropyl alcohol were added to the reaction mixture and stirred in as quickly as possible. The resulting slurry of copolymer was then dumped into warm water to vaporize out the catalyst solvent and the olefinic material. A yield of copolymer amounting to 69% of the mixed isobutylene and dimethylbutadiene was obtained.

This material was inspected and found to have a Staudinger molecular weight number of 66,000 and an iodine number (by the Wijs method) of 2.2. At 20 to 25° C. the polymer was found to contain 4.1% of acetone soluble material.

In comparison, a copolymer made from an identical mixture at the same temperature but with the reaction allowed to continue for 2 full minutes rather than 38 seconds was similarly treated by destroying the catalyst after the end of the 2 minutes, and, after dumping into warm water and drying, was found to have a Staudinger molecular weight number of 58,000 and 8.3% of acetone soluble material.

The dimethyl butadiene, above pointed out, is representative of all of the multi-olefins having more than 1 carbon to carbon double linkages, and from 4 to 14 inclusive carbon atoms per molecule.

These results show the very substantial gain in product quality by the steps of the present procedure.

It would normally be regarded as wasteful of materials to arrest a reaction just at this peak, but in the present instance the loss in polymerizable material is more than made up by the very great improvement of the physical properties of the resulting polymer.

Thus the process of the invention yields a simple polyisobutylene having a much narrower range of molecular weight products for a given average molecular weight than is obtainable by any procedure of the prior art.

While there are above disclosed but a limited number of embodiments of the process and the product of the present invention it is possible to provide still other embodiments without departing from the inventive concept herein disclosed and it is therefore desired that only such limitations be imposed upon the appended claims as are stated therein or required by the prior art.

The invention claimed is:

1. A polymerization process for isobutylene comprising the steps of cooling isobutylene to a temperature within the range between —40° C. and —103° C., adding thereto a Friedel-Crafts polymerization catalyst and thereafter chemically destroying the catalyst activity during the peak of the polymerization reaction and within 5 seconds of the initiation of reaction.

2. A polymerization procedure comprising the steps of mixing isobutylene and a multi olefin having from 4 to 14 carbon atoms per melocule at a temperature within the range between —35° C. and —100° C., copolymerizing the cold mixed olefins by the application thereto of a Friedel-Crafts catalyst comprising boron trifluoride, and thereafter adding to the polymerization mixture, at the peak of the polymerization reaction and within 5 seconds of the initiation of reaction, a chemical catalyst activity destroying agent.

3. A polymerization procedure comprising the steps of mixing isobutylene and dimethyl butadiene at a temperature within the range between —35° C. and —100° C., copolymerizing the cold mixed olefins by the application thereto of a Friedel-Crafts catalyst comprising boron trifluoride, and thereafter adding to the polymerization mixture, at the peak of the polymerization reaction and within 18 seconds of initiation of the polymerization reaction, a chemical catalyst activity destroying agent.

4. A polymerization procedure comprising the steps in combination of cooling isobutylene to a temperature within the range between —35° C. and —100° C. by the addition thereto of non-polymerizable, non-catalytic reactive diluent, having a boiling point below the polymerization temperature but within the polymerization temperature range, polymerizing the isobutylene by the application thereto of an active metal Friedel-Crafts halide catalyst in solution in a solvent characterized by a freezing point below 0° C. and the property of boiling away from the dissolved active metal Friedel-Crafts halide catalyst substance, with a purely nominal rise of temperature of 1° or 2° to leave a solvent-free solute, and thereafter adding to the polymerization mixture and catalyst solution, at a time within 5 seconds of the beginning of the polymerization reaction, a chemical catalyst-activity destroying agent.

5. A polymerization procedure comprising the steps in combination of cooling isobutylene to a temperature within the range between —35° C. and —100° C. by the addition thereto of liquid ethane, polymerizing the isobutylene by the application thereto of an active metal Friedel-Crafts halide catalyst in solution in a solvent characterized by a freezing point below 0° C. and the property of boiling away from the dissolved active metal Friedel-Crafts halide catalyst substance, with a purely nominal rise of temperature of 1° or 2° to leave a solvent-free solute, and thereafter adding to the polymerization mixture and catalyst solution, at a time within 5 seconds of the beginning of the polymerization reaction, a chemical catalyst-activity destroying agent.

PAUL W. BRAKELEY, JR.
DAVID W. YOUNG.

REFERENCES CITED

The following references are of record in the file of this patent:

UNITED STATES PATENTS

| Number | Name | Date |
| --- | --- | --- |
| 2,291,510 | Thomas | July 28, 1942 |
| 2,356,128 | Thomas | Aug. 22, 1944 |
| 2,356,129 | Sparks | Aug. 22, 1944 |